March 11, 1930.  A. V. ROWE  1,750,026
HOG HOUSE
Filed Nov. 21, 1927  3 Sheets-Sheet 1
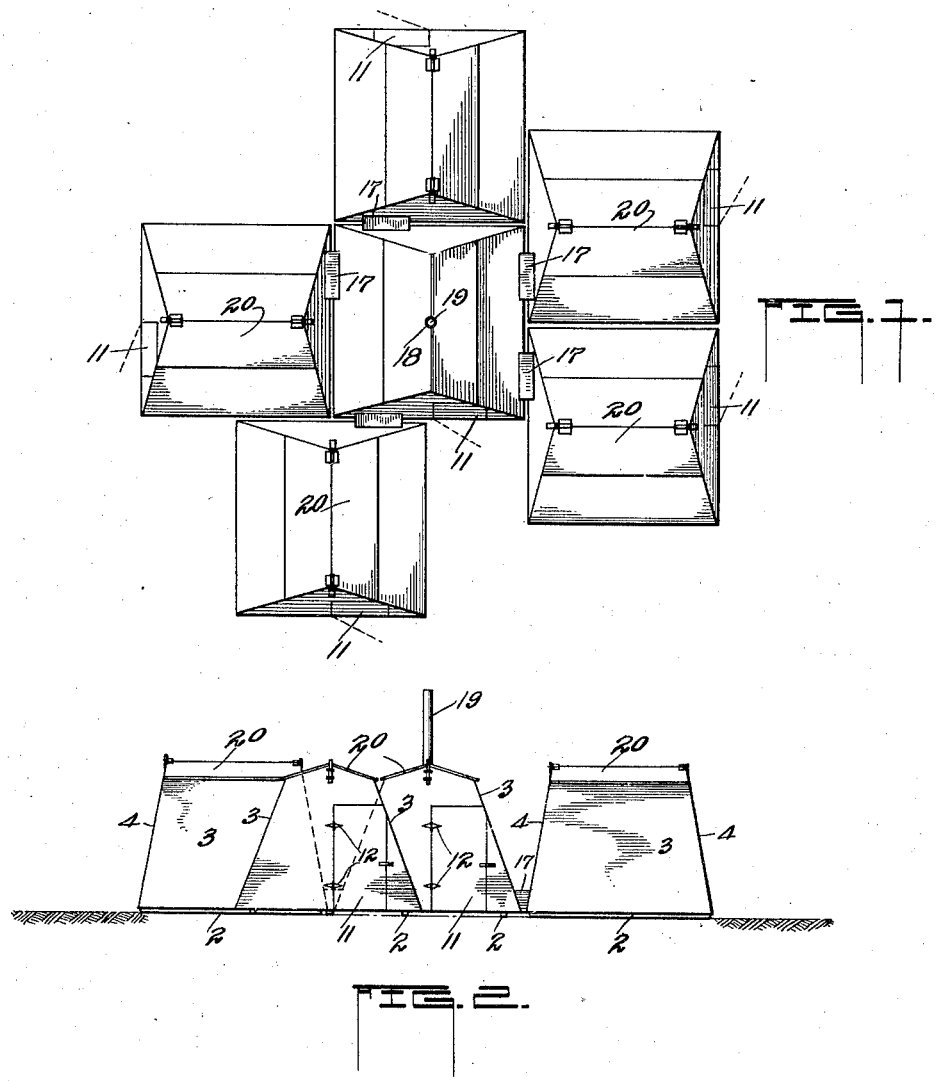
INVENTOR.
Alvin V. Rowe
LaPorte & LaPorte
Att'ys March 11, 1930.  A. V. ROWE  1,750,026
HOG HOUSE
Filed Nov. 21, 1927  3 Sheets-Sheet 2
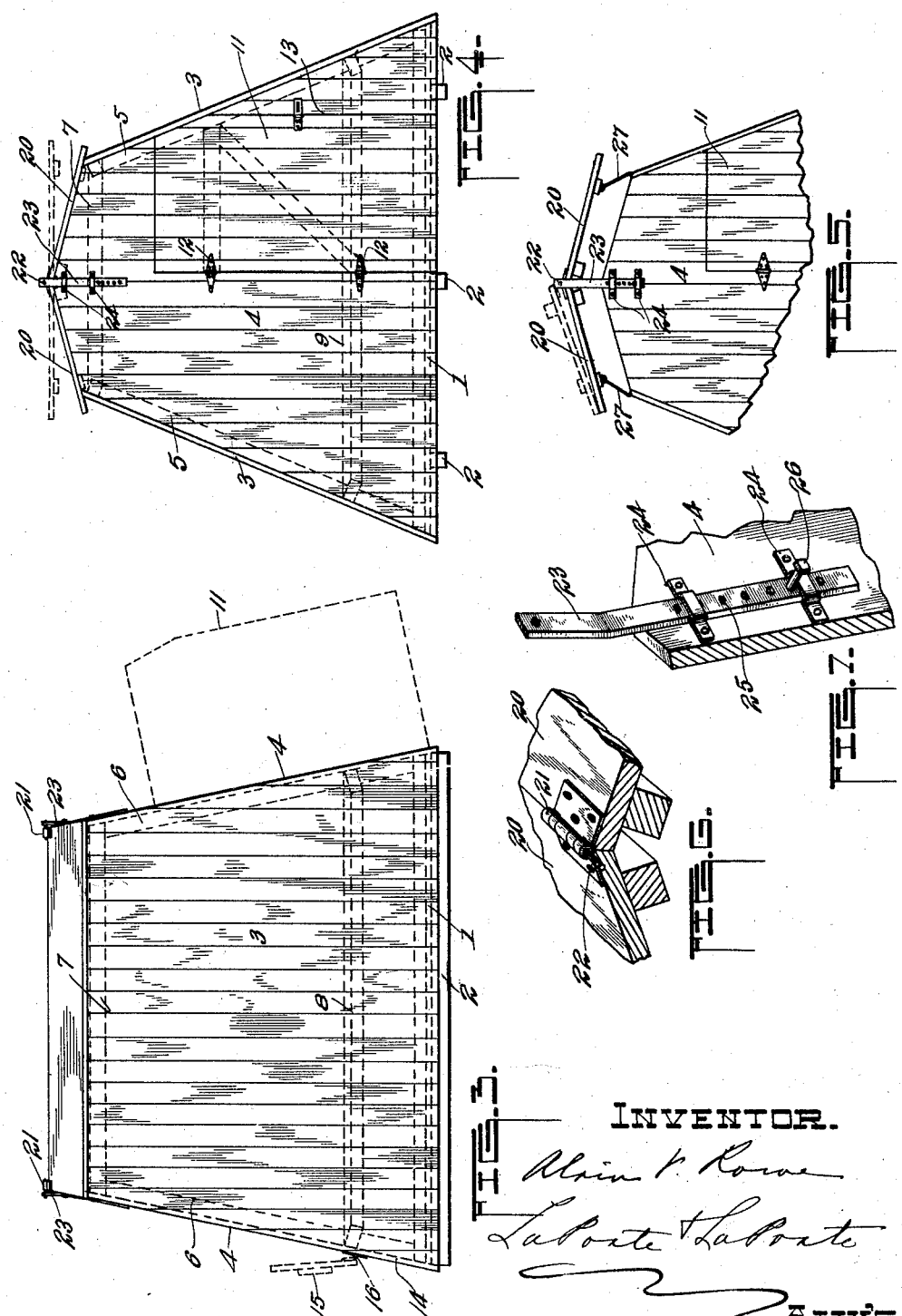

March 11, 1930.  A. V. ROWE  1,750,026
HOG HOUSE
Filed Nov. 21, 1927  3 Sheets-Sheet 3
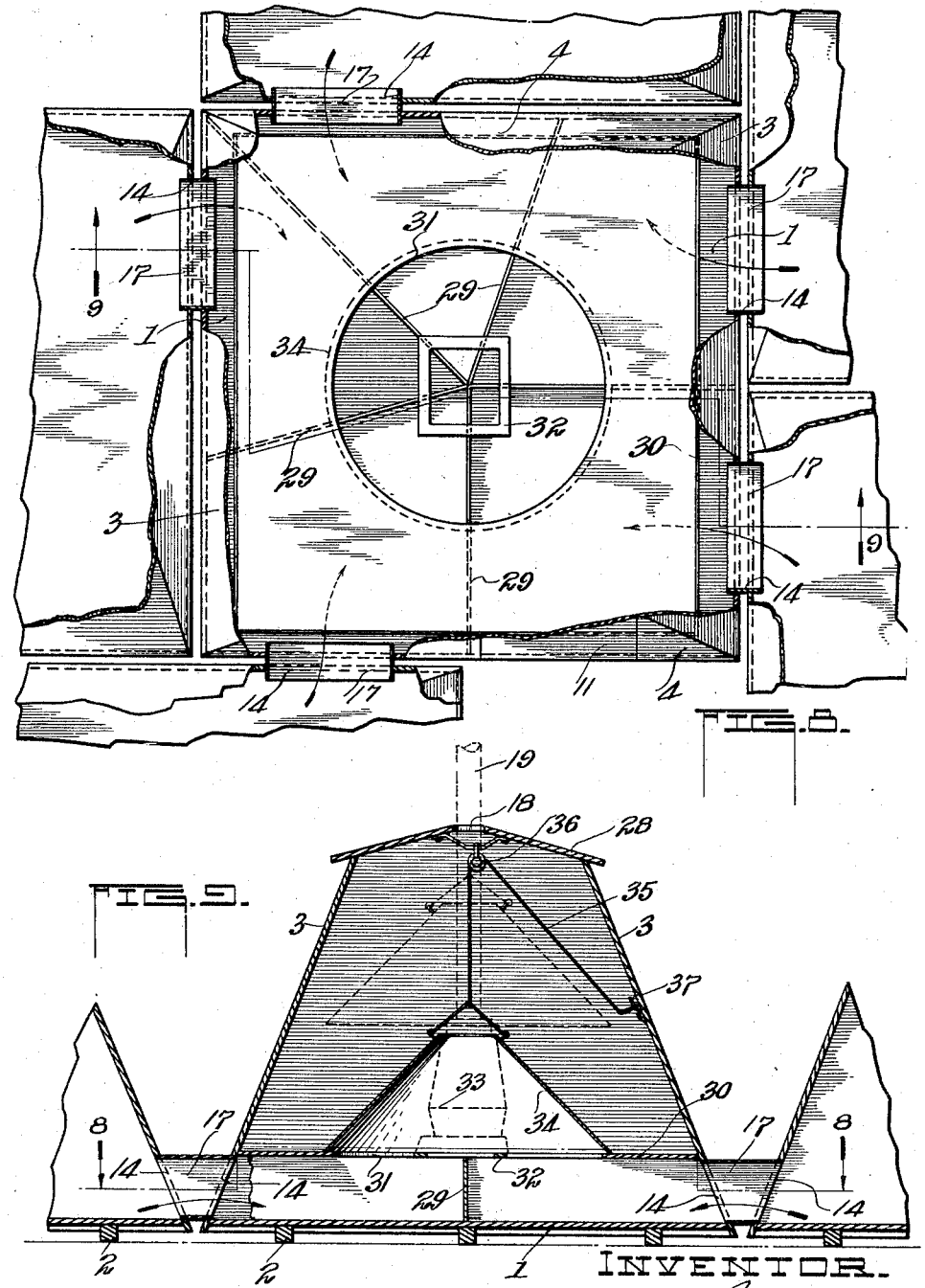

Patented Mar. 11, 1930

1,750,026

UNITED STATES PATENT OFFICE

ALVIN V. ROWE, OF GALESBURG, ILLINOIS

HOG HOUSE

Application filed November 21, 1927. Serial No. 234,666.

This invention has reference to hog houses, and it has for its principal object, to provide for the raiser of hogs a structure having many more and variable uses than any structure of like character with which I am now familiar.

The invention has for a further object to provide in a hog house a structural unit usable individually for sow and pigs; also usable in a group of assembled houses, to provide what may be termed a "pig incubator," where the center house is provided with a brooder stove and a hover, and the several other and adjoining houses having communication with the central unit, enabling the young pigs to have access to the heated unit while preventing the sow from entrance into the same, but required when in doors to stay in such other houses; each sow having a housing unit to herself and the several houses for the sows being separate and distinct from each other, and finally to provide for the detachment and separation of said several units, forming the structure, whereby to provide a "colony" of individual units for each sow and her pigs as soon as the pigs are old enough to be removed from the artificial heating means. In such disassembled state the several units may be used as shade houses for the sows and their litters, during the months when shade is desirable.

The invention has for a further object to provide for the unit, around which the other units are grouped, suitable partitioning means and a platform, whereby to form compartments or chambers, each being in communication with one of the grouped units to allow the small pigs to have access thereto, and further to provide a heating means for such unit, such for instance as a brooder stove and hover means.

A further object of the invention is to provide a housing unit, embodying the characteristics above outlined which is preferably pyramidal in shape, due to the unit having four upwardly and inwardly slanting side walls. Such a design of house is more economical than those having four perpendicular or even two perpendicular side walls, since it requires less lumber to build and it is believed that such a design produces a much stronger structure. Furthermore, such a design of house will more easily and more quickly heat from the natural heat from the sow's body, than will a house which has the perpendicular side walls; and furthermore, provision is made to ventilate the house by a roof structure which may be supported in an elevated position above the top of the house, if desired, and said roof including separate sections hinged so that either or both of said sections may be swung into open position.

A further object of the invention is to provide, at least two openings in each house, protected by hinged door coverings; one a small opening for the small pigs and a larger opening for the sow and also to permit the farmer or herdsman to have access to the house. The door for the larger opening, due to the upwardly inclined wall, will remain either opened or closed, when placed in either of the positions and its lower edge will clear obstructions such as snow, straw and other things; cannot blow shut when opened and cannot be used by the hogs as an element against which to rub, and the smaller openings, when several of the houses are placed about a central unit provide the means of passage for the little pigs from the outside and adjacent houses to the heating and hover means.

A still further object of the invention is to provide guard rails or "pig-rails," around each of the four walls and including the larger door so that the small pigs can seek refuge and protection from the sow when she lies down.

An advantage in the provision of the separate units for the sow, uniformly placed about a central unit and communicating therewith provides a means to segregate the several sows and spreading of any disease and infection is thereby almost, if not entirely, prevented.

Other and further objects will more fully appear from the following descriptions.

That the invention may be more fully understood, reference is had to the accompanying drawings forming a part of this description illustrating a preferred embodiment of the invention, in which:—

Fig. 1 is more or less of a diagrammatical plan view showing a series of the improved hog houses embodying my invention.

Fig. 2 is an elevation of Fig. 1;

Fig. 3 is a side elevation of one of the house units;

Fig. 4 is an end elevation of Fig. 3;

Fig. 5 is a detail in elevation of the upper end portion of a house unit showing the roof in a raised position in full lines and in dotted lines one of the sections of the roof swing back into open position;

Fig. 6 is a detail in perspective showing the hinge structure for the sections of the roof;

Fig. 7 is a detail in perspective of the means for raising and holding the roof structure in elevated position;

Fig. 8 is a sectional detail in plan partly broken away and on a much larger scale than Fig. 1 as the same would appear if taken on the line 8—8, of Fig. 9 looking in the direction of the arrows, and Fig. 9 is a vertical sectional elevation as the same would appear if taken on the line 9—9, Fig. 8 looking in the direction of the arrows and showing in dotted lines the brooder stove and also the hover in a raised position.

Like characters of reference denote corresponding parts throughout the figures.

The several housing units are substantially alike in design and structure and the description of one such unit will therefore suffice for all.

The individual unit and the component parts comprising its structure are best seen in Figs. 3 to 7, both inclusive. It includes a house preferably made of lumber, although it may be made of any other material and is shown provided of a bottom wall or floor 1 to be supported by and above the ground on the longitudinally disposed rails 2. It further comprises the side and end walls 3 and 4, respectively. These walls are each inclined upwardly and inwardly so as to present a house preferably pyramidal in shape. Such walls may be braced in any suitable manner as for instance, by the braces 5, 6 and 7, respectively shown in dotted lines in Figs. 3 and 4. "Pig-rails" 8 and 9, respectively, are shown secured to the inside of the side and end walls, respectively. They are preferably placed at predetermined positions above the flooring or bottom wall 1 and are shown inclined downwardly and inwardly. They function as a protecting means and refuge for the smaller pigs which get thereunder to be protected from the sow when she lies down, as will be understood. The rail 9 at one end of the house is made in sections and one of such sections is secured to and lies across a door 11 which is hinged to the end wall at 12 and adapted to close an opening 13. This opening and door are of a size which permits a sow to enter and leave the house and will also permit a farmer or herdsman to do likewise. The end wall being inclined upwardly is therefore what you might say hung out of plumb; will stay shut easily and when opened will lie back against its end wall. Such a door, when opened can not blow shut and lying against the end wall hogs cannot use it as a rubbing element. Furthermore, a door so hung when being opened or closed will clear itself of snow, straw and other obstructions. The end wall of the house, opposite to that which is provided with the door 11 and the opening 13 is provided with a small opening 14 which preferably extends from the flooring or bottom wall 1 to a point near or at the "pig-rail" 8. This opening is for the small pigs and is of such a size that the sow cannot use it to obtain entrance to the house or for leaving it. This opening may be normally closed by a cover 15 shown in dotted lines in Fig. 3 and removably hinged to the end wall as at 16. It is desirable that the cover 15 be removably attached to the house so that when a number of these houses are in grouped relation as in Figs. 1 and 8, there may be substituted therefor the short removable tunnel 17, Figs. 8 and 9, to provide means of communication between openings 14 of like character in the outside houses which are grouped about a central house. Also, it is necessary in grouping the houses, as in Fig. 1, to provide that house forming the central unit with openings 14 and covers 15, at both ends as well as on both sides. Ordinarily a unit house will include an opening 13 with a door 11 and an opening 14 with a lid 15 and it is a matter of expediency or practice for the user to provide additional openings 14 in the walls of the house for the purpose of grouping the same whereby to obtain the results which are sought and indicated by the grouping as shown in Figs. 1 and 8. Furthermore, the user of such houses will provide that one which he uses as the center of the group with a vent opening 18 in the top thereof through which the flue or stack 19 shown in Fig. 9 may project. It is to be understood that on order from the purchaser the manufacturer may at the purchaser's request provide such additional openings 14 and covers 15 therefor as will enable the user to obtain the results desired and as contemplated by this disclosure.

The house is shown provided with a roof which takes the form of raisable and lowerable sections 20. These sections when in closed position are normally inclined downwardly and outwardly from a point midway the side walls 3 and the end walls have their upper edges tapered or inclined upwardly and inwardly to accomplish this effect. The two said sections 20 are hinged together at their opposite ends by means of hinges 21 and the pintles 22 for such hinges project outwardly from the end walls of the house and have bearing in straps 23 which are adjustable vertically in cleats 24, see Figs. 4, 5 and 7. The said straps 23 are provided with a series of perforations 25 into which bolts or other connecting means 26 may be inserted and adapted to rest on a cleat or cleats 24 whereby the straps may be raised or lowered for holding the roof, comprising the hinge sections, 20 in an elevated or ventilating position, see Fig. 5. When in such position the outer portions of the sections 20 may be supported by the hinge rests 27. It will be obvious, looking at Figs. 4 and 5, that the sections 20 may be swung on their pintles for ventilation or other purposes when the roof is elevated or in the normal closed and lowered position. Not only will such a roof provide for proper ventilation but a farmer or herdsman may observe the sow and her litter without the necessity of disturbing either by opening the door 11 for such an observation, or for any other reason.

By examining Figs. 8 and 9, the grouping of several unit houses will be understood and the manner and form of the communicating means 17 between the outside units and the central unit to permit the young pigs to gain access to said central unit from said outside units and to return again to the latter and also how it is made possible to segregate several sows from each other into separate and distinct enclosures where she may have freedom of action and also removed from the artificial heat to be provided for the central unit which she neither needs nor desires and furthermore through and by means of such distinct grouping disease and infection may in part, if not wholly, be lessened and the spread thereof, if there is any, be in part, if not entirely eliminated. It will further appear from an examination of Figs. 1 and 9 that the roof for the unit which has the vent opening 18 may in effect comprise a single section 28. This, of course, is optional. Furthermore, it will be observed from an examination of Figs. 1 and 8 that the grouping of the units is such that the doors 11 face outwardly in each instance whereby access may be had thereto by a farmer or herdsman and that the arrangement of this grouping is such that the spacing between two of the units leaves a passageway to the central unit and its door 11 which faces outwardly whereby he may have access to the interior of said central unit.

For the purpose of the "pig incubator" I provide for a housing unit and preferably for the central unit when the units are to be grouped, a series of shallow partitions 29 which are so arranged or grouped on the flooring or bottom 1 of the house that they provide separate and individual compartments or chambers with each one of which an outside unit communicates through the inter-position of a tunnel 17, see Figs. 8 and 9. This arrangement will permit the young pigs from each outside unit to enter such compartment or chamber and return to such outside units. The partitions 29 are preferably not much higher than the top walls of the tunnels 17 as the compartments or chambers need not be very high, as will be understood. These partitions may each consist of an individual piece or be made in sections, as desired. Over said sections is provided a flooring 30 which may also be made in sections or not, as desired, and said partitions and flooring are sufficiently stiff and strong to carry the weight of a person who may walk thereon entering and leaving through a doorway 13. The flooring 30 is provided with an enlarged central opening 31 to expose the inner portions of the compartments or chambers and the partitions 29 forming the same and resting on the inner portions of the partitions is a ring-like support 32 on which may rest a brooder stove 33 to which is connected the flue 19 passing up and out through the vent 18 in the roof of the house. A preferably cone-shaped hover 34 is provided which normally rests on the flooring 30 to cover the opening 31 therein and arranged to direct heat from the stove 33 to the compartments or chambers formed within the house, being provided with an opening at its upper end through which projects the flue 19. The hover may or may not be made of one piece, as desired, and for the hover a raising and lowering means is provided comprising a cable 35 connected to the hover, carried over a sheave wheel 36 suspended from the roof of the house and adapted to be fastened on a cleat 37 secured to a side wall of the house.

What I claim is:—

1. In a hog house, in combination, a plurality of individual separable and independent structural units, the said units adapted for assembly to provide a central unit and the remaining units grouped therearound in adjacent relation thereto and for communication therewith, each unit having closed walls and certain of said walls having an opening to permit entrance into and exit from the said units, a closure for each of said openings, means providing communication between each of the said grouped units respectively with said central unit, means to form a plurality of compartments in said central unit, one compartment coincident with each of said communicating means, and a hover means centrally disposed in said central unit and above said compartment forming means.

2. In a hog house, in combination, a plurality of individual, independent and separate units, the said units being assembled to provide a central unit and the remaining units grouped thereabout, each unit having an opening to permit entrance into and exit from the said units, a closure for each of said openings, means providing communication between each of the said grouped units respectively and said central unit, means to form a plurality of shallow compartments in said central unit, one compartment coincident with each of said communicating means, and a hover means centrally disposed in said central unit and above said compartment forming means; each of said grouped units providing a separate housing for the segregation of a sow and litter of pigs and said communicating means between each grouped unit and the central unit permitting the litter of each sow to have access to a single compartment in said central unit.

3. In a hog house of the character described, a building structure having side walls inclined inwardly and upwardly, each wall provided with an opening to permit entrance into and exit from said building, a plurality of shallow partitions radiating from the center of said building to the side walls of the building and forming compartments one compartment coincident with an opening in its side wall, a platform covering said partitions and having a central opening over the apical portions of said compartments, the platform extending from the opening to the side walls, and a hover supported above said central opening, and means to raise and lower said hover.

In witness thereof, I have hereunto affixed my hand this 18th day of November, 1927.

ALVIN V. ROWE.